United States Patent
Gregory et al.

(10) Patent No.: US 9,416,693 B2
(45) Date of Patent: Aug. 16, 2016

(54) DOWEL BOLTS FOR MOUNTING AN OIL PUMP TO AN ENGINE ASSEMBLY

(71) Applicant: Ford Global Technologies, LLC, Dearborn, MI (US)

(72) Inventors: Jonathan Gregory, Colchester (GB); Robert Davies, Braintree (GB); Pedro Nali, Kingston (GB); Xavier Demeulenaere, London (GB); Marc Pinnegar, Hornchurch (GB)

(73) Assignee: Ford Global Technologies, LLC, Dearborn, MI (US)

( * ) Notice: Subject to any disclaimer, the term of this patent is extended or adjusted under 35 U.S.C. 154(b) by 28 days.

(21) Appl. No.: 14/326,379

(22) Filed: Jul. 8, 2014

(65) Prior Publication Data
US 2016/0010518 A1    Jan. 14, 2016

(51) Int. Cl.
| F02B 75/06 | (2006.01) |
| F01M 1/02 | (2006.01) |
| F02B 75/20 | (2006.01) |
| F16F 15/26 | (2006.01) |
| F02B 67/00 | (2006.01) |

(52) U.S. Cl.
CPC .............. *F01M 1/02* (2013.01); *F16F 15/264* (2013.01); *F01M 2001/0276* (2013.01); *F01M 2001/0284* (2013.01); *F02B 67/00* (2013.01); *F02B 75/06* (2013.01); *F02B 75/20* (2013.01); *F16F 15/265* (2013.01); *F16F 2226/04* (2013.01); *F16F 2230/0011* (2013.01)

(58) Field of Classification Search
CPC ....... F16F 15/264; F16F 15/265; F02B 75/20; F02B 75/06; F02B 67/00

USPC ....................................................... 123/192.2
See application file for complete search history.

(56) References Cited

U.S. PATENT DOCUMENTS

| 5,743,230 | A | 4/1998 | Yamazaki et al. |
| 6,305,339 | B1 * | 10/2001 | Iwata ................... F16F 15/264 |
| | | | 123/192.2 |
| 6,722,860 | B2 | 4/2004 | Asano |
| 6,758,183 | B2 | 7/2004 | Endo et al. |
| 8,490,595 | B2 | 7/2013 | Bittner et al. |
| 2010/0077742 | A1* | 4/2010 | Ehlen ................ B01F 3/04049 |
| | | | 60/324 |

OTHER PUBLICATIONS

Guangzhou Longcham Hardware Co., Ltd.; furniture joint connector; 2012; Alibaba; p. 1.*

* cited by examiner

*Primary Examiner* — Lindsay Low
*Assistant Examiner* — Charles Brauch
(74) *Attorney, Agent, or Firm* — Greg Brown; Alleman Hall McCoy Russell & Tuttle LLP

(57) ABSTRACT

Methods and systems are provided for an oil pump mounting structure that provides accessibility and removal of the oil pump without removing a balancer shaft. While periodically servicing or replacing the oil pump may be necessary throughout the lifetime of an engine, it is desirable to allow for easy removal of the oil pump without removing and reassembling other engine components. To provide alignment and a rigid connection between the oil pump and engine frame while allowing for removal of the oil pump without removing other components, dowel bolts with unthreaded, threaded, and dowel portions are used to mount the oil pump to the engine frame.

16 Claims, 9 Drawing Sheets

DOWEL BOLTS FOR MOUNTING AN OIL PUMP TO AN ENGINE ASSEMBLY

FIELD

The present application relates generally to systems and methods for removing an oil pump from an internal combustion engine assembly attached via one or more dowel bolts.

SUMMARY/BACKGROUND

An oil pump provided in a vehicle engine is powered by a balancer shaft located underneath a crankshaft and a plurality of cylinders of the engine. The balancer shaft, receiving rotational power from a gear drive attached to the crankshaft, joins with a portion of the oil pump via a meshing connection. When the engine is operating, the oil pump is also operated to pressurize oil located in a sump of the engine (i.e., oil pan). The pressurized oil is routed through a number of passages located throughout the engine for providing cooling and/or lubrication to the engine and its components. During the engine's lifetime, the oil pump may be periodically serviced and/or replaced. As such, the inventors herein have recognized that it is desirable to provide a support structure of the oil pump that allows for simple removal of the oil pump from the engine to save cost and time.

In a structure for an oil pump shaft and a balancer shaft, shown by Endo et al. in U.S. Pat. No. 6,758,183, a crankshaft provides power to the oil pump via a number of connections and shafts. A driving sprocket is fixed on the crankshaft while an endless chain connects the driving sprocket to a driven sprocket fixed on an input-side balancer shaft. Rotation force of the crankshaft is transmitted from the input-side balancer shaft to an output-side balancer shaft via gears so an oil pump shaft can rotate. In this embodiment, the two balancer shafts are located side-by-side and the oil pump is mounted to the oil pump shaft which is collinear with the output-side balancer shaft. Due to the proximity of the driven sprocket, various shafts, and the oil pump, when assembled the driven sprocket and other components are positioned in front of the oil pump. The other components include a tensioning system with a tensioner body, a shoe, and a tubular oil conduit. The components, located at the end of the balancer shafts, are adjacent to the oil pump such that the oil pump is sandwiched against the oil pump shaft (connected to the output-side balancer shaft).

However, the inventors herein have identified potential issues with the oil pump structure of U.S. Pat. No. 6,758,183. If the oil pump needs to be removed from the engine to be serviced or replaced before other components such as the shafts need to be replaced, then the structure may hinder the removal process. In particular, parts of the balancer shaft assembly and associated components may need to be disassembled prior to removing the oil pump. For example, the driven sprocket, tensioning system, and endless chain may be unfastened and removed prior to pulling the oil pump from the oil pump shaft. This process may increase the amount of time and serviceability cost associated with replacing or otherwise repairing the oil pump. Furthermore, while reinstalling the oil pump, the tensioning system will also be reinstalled, which may require careful tightening of the endless chain as well as adjustment of other tensioning components. As such, periodical servicing of the oil pump may be more expensive, difficult, and time-consuming than other systems that provide easier access to the oil pump.

Thus in one example, the above issues may be at least partially addressed by a system, comprising: an oil pump with a drive end that meshes with a balancer shaft inside a fully enclosed support structure, wherein the drive end fixedly rotates with the balancer shaft; and a plurality of dowel bolts fixing and aligning the oil pump to an engine frame, wherein a substantially flat bottom surface of the oil pump has face-engaging contact with a substantially flat top surface of the engine frame. In this way, the oil pump may be serviced or replaced while reducing the number of components also removed from the engine during the servicing. In a similar sense, putting the oil pump back into the engine is also made easier. Each of the dowel bolts comprise an unthreaded shank, a dowel portion, and a threaded portion such that the dowel portion only partially inserts into both the oil pump and engine frame to provide alignment while the threaded portion meshes with threads of a tapped hole located in the engine frame. By removing the dowel bolts, sliding the oil pump axially, then lifting the oil pump from the engine in a transverse direction, the oil pump can be removed from the engine without removing other components such as the balancer shaft.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
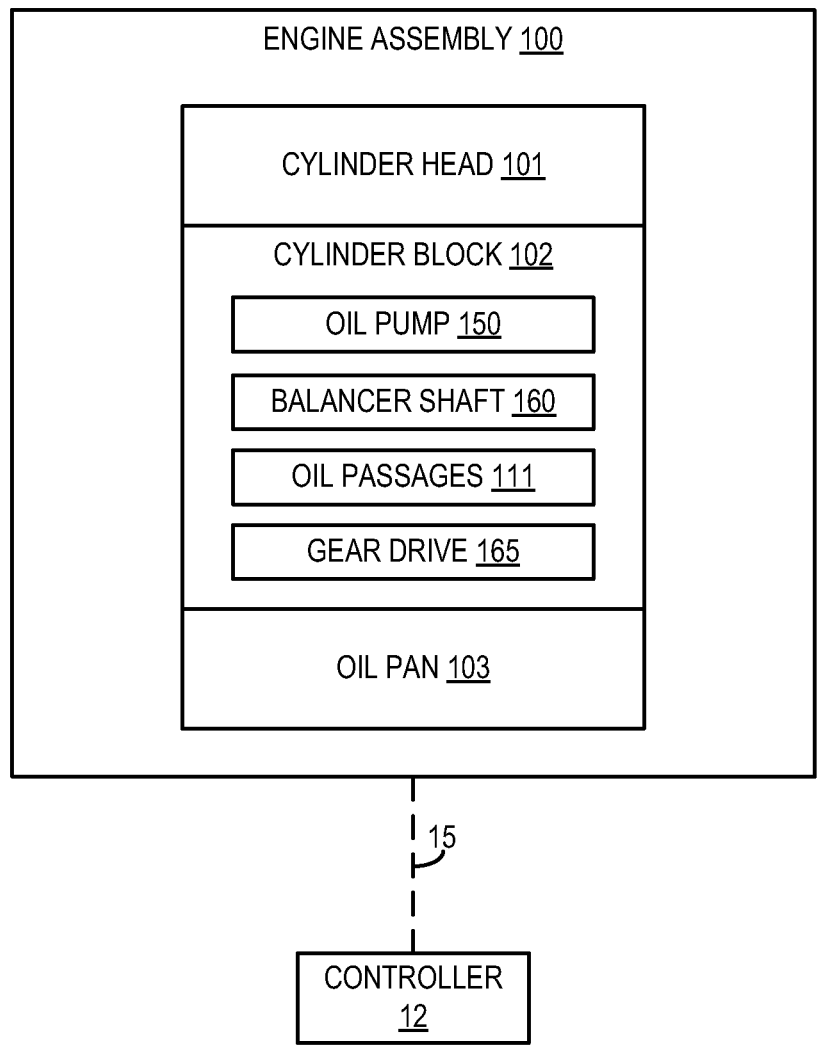
FIG. 1 shows a simplified schematic depiction of an engine assembly and associated components.
Figure 2:
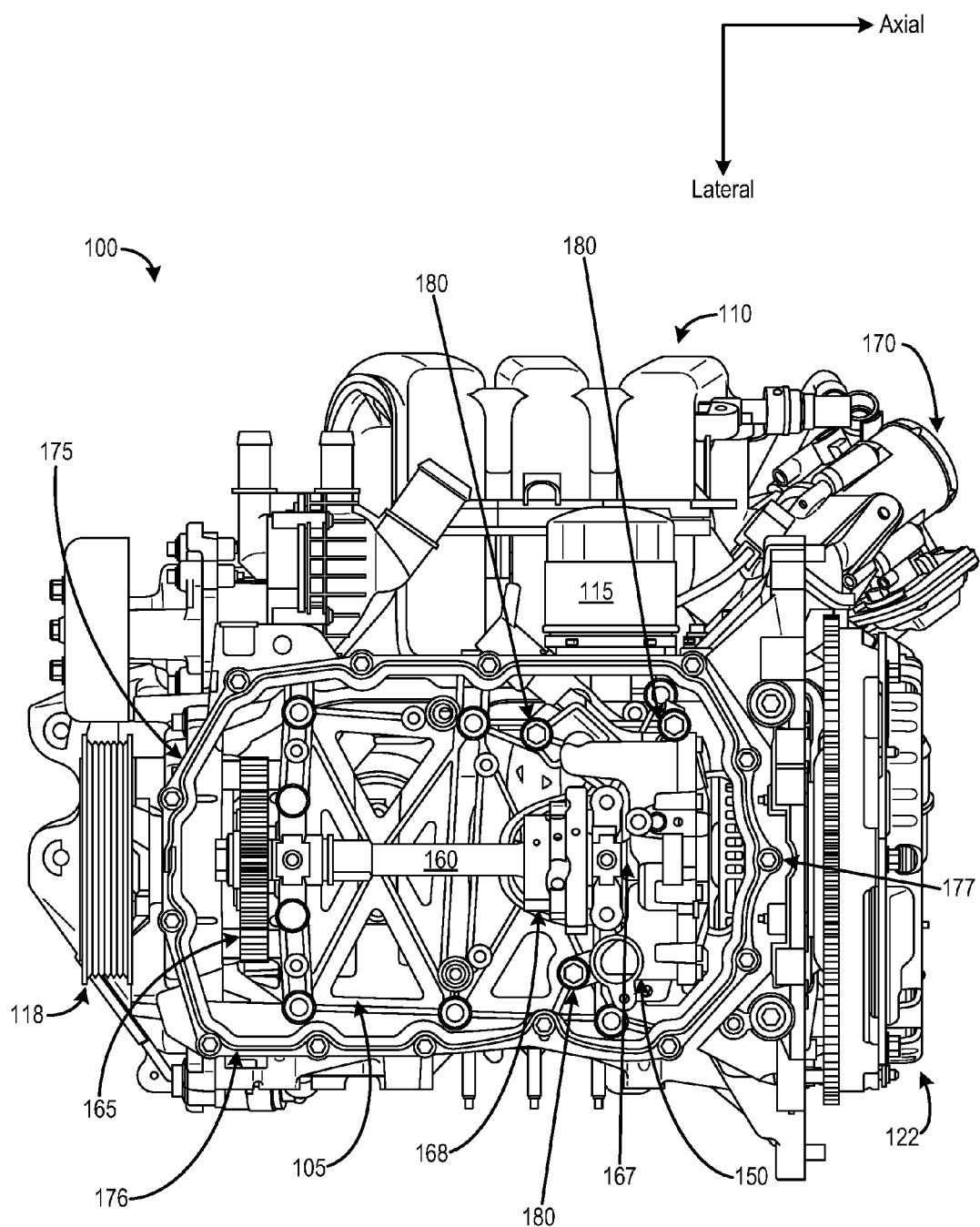
FIG. 2 shows a bottom view of an engine assembly with several components removed for ease of viewing.
Figure 3:
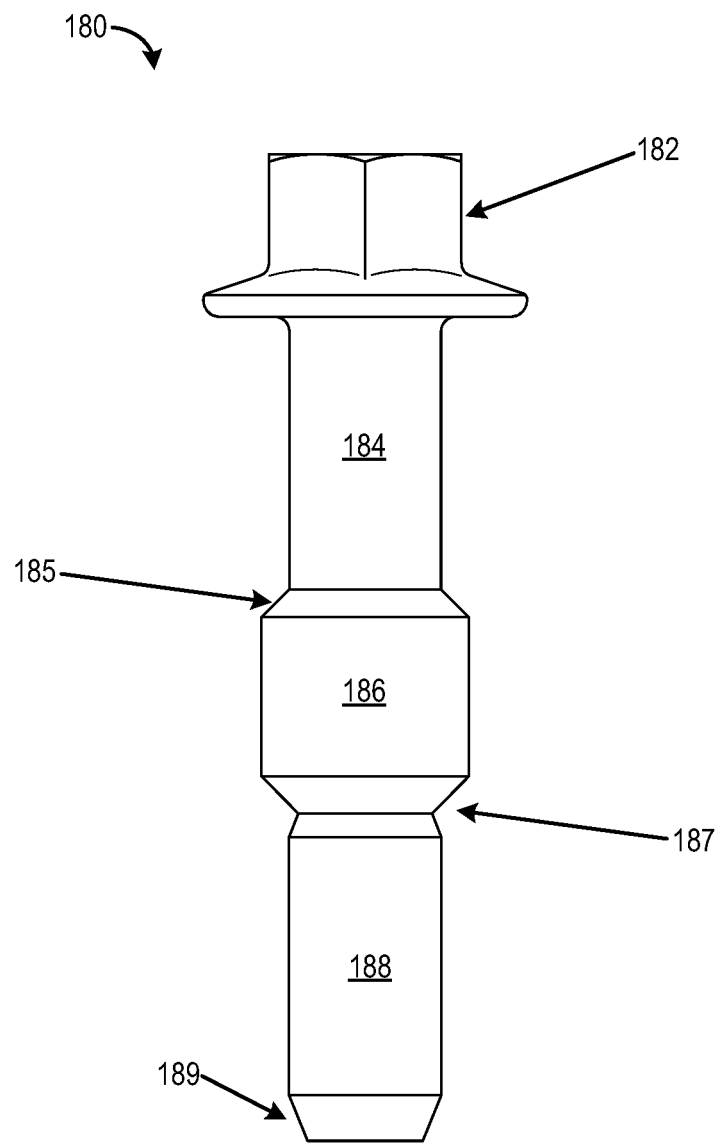
FIG. 3 shows a side view of a dowel bolt.
Figure 4:
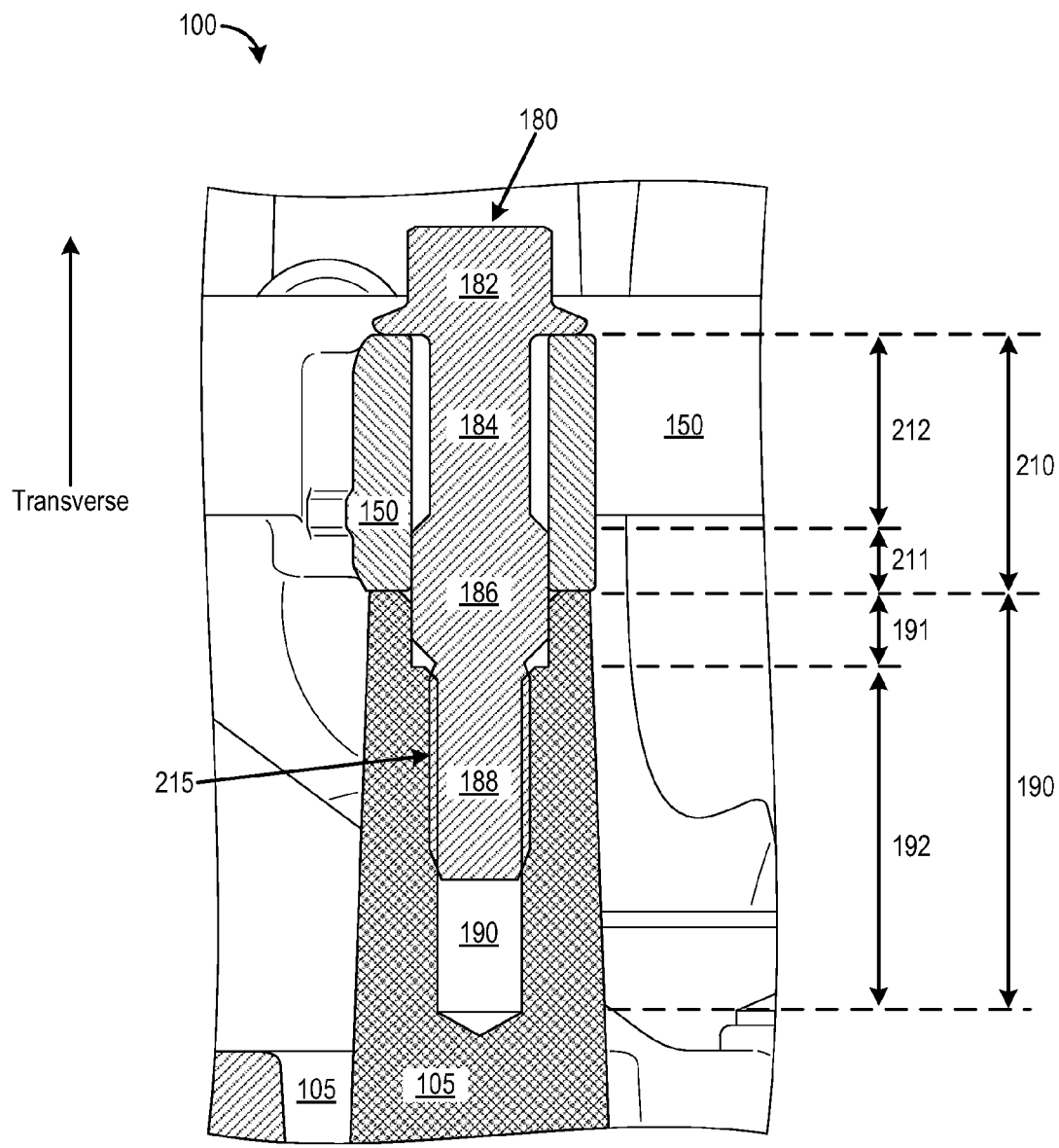
FIG. 4 shows the dowel bolt of FIG. 3 inserted into an oil pump and frame of the engine assembly of FIG. 2.

The following detailed description provides an engine assembly and the proposed dowel bolts and method for removing an oil pump from the engine assembly without removing a balancer shaft. An example schematic depiction of an engine assembly is shown in FIG. 1. FIG. 2 shows a bottom view of an engine assembly with an oil pan removed for ease of viewing interior components. FIG. 3 shows a side view of a dowel bolt while FIG. 4 shows the dowel bolt inserted into the oil pump and engine frame from a cross-sectional view. FIGS. 5-8 illustrate removing the oil pump from the engine assembly by first removing the dowel bolts, sliding the oil pump axially, and then lifting the oil pump transversally from the engine assembly. Finally, FIG. 9 describes a method for removing the oil pump that is shown in FIGS. 5-8.

FIG. 1 shows an example schematic depiction of an engine assembly 100. The engine assembly includes a cylinder head 101 that may be removably attached (i.e., selectively coupled) to a cylinder block 102. In the current example, the coupling between the cylinder head 101 and cylinder block 102 form at least one cylinder for providing combustion and power to the vehicle that engine assembly 100 is part of. It will be appreciated that the engine assembly 100 may further include various components for attaching the cylinder head 101 to the cylinder block 102 such as a head gasket (not shown), bolts or other suitable attachment apparatuses, etc. Furthermore, engine assembly 100 may include additional components configured to perform combustion in the at least one cylinder.

While the cylinder head 101 is coupled to a top portion of cylinder block 102, an oil pan 103 is coupled to the bottom portion of the cylinder block. The oil pan 103 may provide a bottom structure for enclosing components of the cylinder block 102, such as a crankshaft and connecting rods for providing power to the vehicle. The oil pan 103, sealed to the bottom side of the cylinder block 102, may also contain an oil reservoir into which oil from the rest of the engine assembly 100 can collect due to gravity.

The cylinder block 102 includes an oil pump 150 that is located in the lower portion of the cylinder block, proximate to the oil pan 103. In some examples, the oil pump 150, while attached to a frame of the cylinder block 102, extends at least partially into the oil pan 103. A balancer shaft 160, located below the crankshaft, may receive power from the crankshaft via a gear drive 165 and provide that power to the oil pump 150. Furthermore, the cylinder block 102 and cylinder head 101, in some cases, include a series of oil passages 111 that are routed throughout the cylinder block and cylinder head adjacent to the cylinders. As such, cooling oil or other coolant may be pressurized by oil pump 150 and sent through the passages 111. As explained in more detail later, the passages or ports 111 may align with ports of the oil pump 150 to provide efficient transfer of oil between the oil pump 150 and cylinder block 102.

Finally, a controller 12 may be coupled to various components of engine assembly 100 via an electrical connection 15. It is noted that additional components may be included in engine assembly 100 that are not shown in the simplified schematic of FIG. 1. For example, cylinder head 101 may be configured with one or more camshafts for providing actuating motion to a series of intake and exhaust valves for each cylinder. Additionally, engine assembly 100 may include components such as intake and exhaust manifolds and a fuel system that are not shown in FIG. 1.

Some engine systems may have a serviceability requirement that the oil pump can be removed in-service with little or no effect on adjacent components surrounding the oil pump. The adjacent components may include the drive shaft, gear drives, and other similar accessories. Since the oil pump may need to be periodically serviced and/or replaced before the rest of the engine, it may be beneficial to allow for easier removability of the oil pump compared to other components. For example, time and money may be saved when only several bolts need to be removed when removing the oil pump compared to removing the gear drive and other components. As such, the aforementioned serviceability requirement may reduce labor times, warranty costs, and/or customer servicing costs, all of which may be beneficial to the owner of the vehicle and the vehicle's overall appeal.

As described above with regard to FIG. 1, with some engine systems the oil pump is mounted underneath the engine in the sump or other suitable area within the oil pan. In this bottom end configuration, the oil pump may be driven by a balancer shaft that receives rotational power from the crankshaft via a number of gears or other suitable components. In some examples, the balancer shaft has a hexagonal male end that locates inside a female hexagonal drive located in the oil pump. As such, in order to remove the oil pump from the engine, the oil pump is first disengaged from the male balancer shaft end in an axial direction aligned with the axial direction of the balancer shaft (and crankshaft). Then, the oil pump can be lifted from the engine in a transverse direction perpendicular to the axial direction. In other examples, the balancer shaft contains the hexagonal female end that locates inside the hexagonal male end of the oil pump. Other configurations are possible besides hexagonal connections wherein axial movement between the oil pump and balancer shaft is still required to remove the oil pump from the engine assembly. In some embodiments, ring dowels and mounting bolts are used in conjunction to secure the oil pump to the engine. In particular, the ring dowels in the shape of hollow cylindrical spacers partially insert into the engine frame and also partially insert into the oil pump. Furthermore, the mounting bolts fasten the oil pump to the frame by inserting through the dowel rings. In this way, both axial and transverse alignment may be maintained in order to provide proper engagement between the balancer shaft and oil pump as well as between the oil pump ports and frame ports.

However, with the use of both ring dowels and mounting bolts, removal of the oil pump may be complicated and against the serviceability requirements. In the present example engine configuration with the oil pump located on the bottom and driven by the balancer shaft, upon removal of the mounting bolts the oil pump may be substantially prevented from moving axially by the ring dowels. Since the ring dowels insert into both the engine frame and oil pump, the oil pump may only move transversely once the mounting bolts are removed. However, since the balancer shaft and female (or male) drive of the oil pump are engaged, the balancer shaft needs to be disassembled prior to removing the oil pump. This method of removing the oil pump may waste time and cost associated with pump servicing since the balancer shaft and other components may need to be removed along with the oil pump.

The inventors herein have recognized that the desired axial and transverse alignment of the oil pump can be achieved along with satisfying the serviceability requirements with the use of several dowel bolts and a mounting/removal method of the oil pump. Each of the dowel bolts, explained in further detail below, includes a shank with a larger diameter than the threaded portion of the bolt. The shank with the larger diameter may replace the function of the aforementioned dowel ring in that the shank may partially insert into both the oil pump and the frame of the engine. With the alignment and fastening function of the dowel and bolt combined into a single-piece dowel bolt, the aforementioned issues may be at least partially resolved, as explained in further detail below.

FIG. 2 shows a bottom view of an engine assembly 100 with an oil pan and balancer shaft cover removed for ease of viewing the interior of the engine assembly. An axial and a lateral direction perpendicular to the axial direction are shown in FIG. 2. The axis of the crankshaft (not visible) may be parallel with the axial direction. Several components can be seen in FIG. 2, including a portion of intake manifold 110, oil filter 115, electronic throttle valve 170, and frame 105. A drive pulley 118 is also visible in FIG. 2, which may be coupled to the end of the crankshaft (not visible) at the front of the engine assembly 100 such that rotational motion of the crankshaft is translated to rotational motion of the drive pulley. A series of additional drive pulleys and/or gear drives may be coupled to drive pulley 118 via multiple belts and/or chains such that rotational motion of drive pulley 118 can be used to power peripheral engine components. The peripheral components, or front end accessory drive devices, include various pumps, an air conditioning compressor, an alternator, a thermostat, etc. Opposite to drive pulley 118 on the rear end of the engine assembly 100 a clutch 122 is visible. Clutch 122 may be part of the transmission system of the vehicle.

Frame 105 may be a ladder frame integrated into the engine assembly 100 for providing structural support for various components as well as for the engine assembly itself. Ladder frame 105 consists of substantially rigid material of varying shape and size. Furthermore, the ladder frame may contain a number of hollow ports (i.e., passages with no material) for circulating coolant, oil, and/or other fluids throughout the engine assembly 100. The hollow ports may include the oil passages 111 shown in FIG. 1 and described above. The periphery of crankcase 175 can also be seen in FIG. 2 along with a gasket 176 and bolt holes 177 for securing the oil pan (not shown) to the crankcase. Crankcase 175 may be included in the cylinder block such that the crankcase is integrated into the cylinder block as a single piece, as shown in FIG. 1. Inside crankcase 175, an oil pump 150 can be seen along with a balancer shaft 160.

As explained above, the balancer shaft 160 may be driven by a gear drive 165 which receives power from the crankshaft (not visible). A fully enclosed support structure 168 is shown that is located in between oil pump 150 and balancer shaft 160. In some examples, the support structure 168 may include bearings and other components for maintaining alignment and support of balancer shaft 160. As seen in FIG. 2, balancer shaft 160 is partially inserted into the fully enclosed support structure 168 such that the end of the balancer shaft is not visible. Furthermore, a portion of oil pump 150 that contains components for engaging with the balancer shaft 160 is labelled as drive end 167. In other words, drive end 167 is included in pump 150, wherein the drive end includes gears, splines, shafts, clutches, or other components for receiving rotational power from balancer shaft 160. Mentioned above, the drive end 167 may include a hexagonal configuration such that hexagonal pieces meet and mesh to form a rigid connection between oil pump 150 and balancer shaft 160 inside support structure 168. Drive end 167 may receive power from the balancer shaft 160 via the hexagonal or other similar connection between the balancer shaft and drive end in order to power oil pump 150. In other embodiments, balancer shaft 160 and drive end 167 may engage indirectly, wherein torque transmitting components located inside support structure 168 provide intermediate connection between the balancer shaft and drive end. Additionally, male and female connections as described previously may be provided on one or a combination of the balancer shaft 160, parts of support structure 168, and on drive end 167. The male and female connections may provide substantially rigid connection between the balancer shaft and drive end. The connection allows for torque and rotation to be transmitted from balancer shaft 160 to the drive end 167 via the support structure 168. Similar to the frame 105, oil pump 150 may include a number of hollow ports for providing pressurized oil to the frame when the oil pump is mounted to the frame.

Oil pump 150 is held to frame 105 by a plurality of dowel bolts 180. In the embodiment shown in FIG. 2, three dowel bolts 180 are shown while it is appreciated that fewer or more dowel bolts may be present depending on the configuration of the engine assembly 100. Dowel bolts 180 may provide a substantially rigid connection between frame 105 and oil pump 150 such that movement of one component corresponds to movement of the other component. Furthermore, when dowel bolts 180 fasten oil pump 150 to frame 105, a substantially rigid connection is formed such that alignment is maintained between the oil pump and drive end 167 (and balancer shaft 160) as well as between the ports of the oil pump and frame (not visible). Alignment between the ports may provide substantially uninhibited fluidic movement of oil through the ports, where the oil is pressurized by the oil pump 150. Furthermore, alignment between the ports may reduce oil leakage through the interface between the oil pump 150 and frame 105. As explained in further detail later, upon removal of dowel bolts 180, the oil pump 150 may slide in the axial direction to disengage the pump from the drive end 167 prior to being lifted away from the engine assembly 100.

As seen in FIG. 2, oil pump 150 may have a roughly rectangular shape with several protrusions such that the oil pump surrounds three sides of support structure 168. In another example configuration, the oil pump may be adjacent to support structure 168 only on a single end while the rest of the pump extends away from the support structure and the balancer shaft 160. It is noted that other engine assembly configurations as well as arrangements of the oil pump, balancer shaft, gear drive, and other components while remaining within the scope of the present disclosure.

FIG. 3 shows a side view of dowel bolt 180, which may be the same bolt shown in FIG. 2 and in subsequent figures. Dowel bolt 180 includes several sections along its length, starting with a head 182 that forms a top end of the bolt. In the current embodiment of bolt 180, head 182 has a generally hexagonal shape to conform to fastener standards, but it is appreciated that other shapes are possible. The bolt head 182 may vary according to requirements of the engine assembly 100. Directly below bolt head 182 is a first shank 184 (first portion or unthreaded shank), which may also be referred to as the oil pump shank. The portion below first shank 184 is a second shank 186, which has a larger diameter than first shank 184. The second shank 186 or dowel portion 186 may replace the function of the aforementioned dowel ring and be machined to a tolerance to ensure alignment between the oil pump 150 and the attaching structure, such as the frame 105 in this case. Both shanks 184 and 186 may have generally smooth surfaces for precise face-to-face contact with an adjacent hole, as described in more detail below. Next, below the second shank 186 is a threaded portion 188 which extends from the second shank to form the end of dowel bolt 180. Although not visible in FIG. 3, the threaded portion 188 contains a plurality of threads which may mesh with the receiving threads of a tapped hole.

Between the first shank 184 and second shank 186 is a first tapered portion 185 that bridges between the different-sized diameters of the first and second shanks. Alternatively, an abrupt increase in diameters may create a perpendicular joint between the first shank 184 and second shank 186. The perpendicular joint may act as a stress concentration, which may cause the dowel bolt 180 to fracture prior to an expected lifespan. As such, the first tapered portion 185 may relieve the stress concentration and transfer stress more smoothly throughout the length of dowel bolt 180. In a similar fashion, a second tapered portion 187 bridges the different diameters of the second shank 186 and threaded portion 188. The second tapered portion 187 may serve substantially the same function as the first tapered portion 185, that is, relieving stress concentrations between the different shanks and portions of the dowel bolt 180. Additionally, the sloped shape of the tapered portion 187 may also aid when inserting the dowel bolt 180 into a receiving hole of the engine assembly 100. In other words, the tapered portion 187 may make first make contact with a rim of the receiving hole, allowing the rest of dowel bolt 180 to then easily slide into position within the hole and engine assembly. Finally, an end tapered portion 189 may be located at an end of the dowel bolt 180 opposite from bolt head 182. The shape and size of end tapered portion 189 may depend on the particular system configuration and bolt specifications (e.g., thread pitch).

FIG. 4 shows a side view of the dowel bolt 180 inserted into the oil pump 150 and frame 105. In particular, the position of dowel bolt 180 may be referred as a rundown position. The frame 105 includes a first hole 190 comprising a frame alignment portion 191 as well as a tapped portion 192 located below and adjacent to the alignment portion. In FIG. 4, above and below may be relative to the transverse direction, which points opposite to the direction of gravity. Similarly, oil pump 150 includes a second hole 210 with an oil pump alignment portion 211 as well as a length 212 located above and adjacent to the alignment portion. Tapped portion 192 includes receiving threads to mesh with the threads of bolt 180 while length 212 does not include threads. To insert dowel bolt 180 through the oil pump 150 and frame 105 in order to secure the oil pump to the frame, holes 190 and 210 may align in a concentric fashion. It is noted that second hole 210 and frame alignment portion 191 may share substantially the same diameter.

As seen in FIG. 4, when bolt 180 is inserted, the threaded portion 188 of bolt 180 is meshed with a number of the threads of tapped portion 192. The area where the threads meet is labeled in FIG. 4 as surface 215, wherein engagement between bolt 180 and frame 105 occurs. When bolt 180 is tightened, the bolt head 182 may provide fastening (i.e., compressive) force between the oil pump 150 and frame 105. In other words, the threaded portion 188 and bolt head 182 may provide compressive force between oil pump 150 and frame 105 to secure the two pieces relative to each other. In this case, securing between oil pump 150 and frame 105 may substantially prevent movement between the two components. The degree of rigidity and tightness between the oil pump 150 and frame 105 may be adjusted by rotating dowel bolt 180 to either increase or decrease the size of surface 215.

While tightening bolt 180 provides a secure and substantially rigid connection between the oil pump 150 and frame 105, dowel portion 186 may provide alignment between the two components, in particular between the first hole 190 and second hole 210. As stated previously, proper alignment between the oil pump 150 and frame 105 may provide uninhibited fluidic communication between ports of the two components for pumping oil into the engine assembly 100. As seen in FIG. 4, while bolt 180 is inserted through holes 190 and 210, dowel portion 186 may be in contact with both frame alignment portion 191 as well as oil pump alignment portion 211. In particular, a lower section of dowel portion 186 may have face-sharing contact with alignment portion 191 and at the same time, an upper section of dowel portion 186 may have face-sharing contact with oil pump alignment portion 211. As such, the second shank 186, forming the dowel portion of bolt 180, may provide proper alignment between the oil pump 150 and the frame 105. The upper and lower sections of second shank 186 may be substantially equal or different in some embodiments. The adjacency and tolerances between portions 191, 211, and 186 may provide the desired alignment between oil pump 150 and frame 105. As such, the dowel bolt 180 provides both axial and transverse alignment to provide proper engagement between balancer shaft 160, support structure 168, and drive end 167 of oil pump 150, as well as between the oil pump ports and frame ports.

With the components shown in FIGS. 2-4, an oil pump is provided with a drive end that meshes with a balancer shaft inside a fully enclosed support structure, wherein the drive end fixedly rotates with the balancer shaft; and a plurality of dowel bolts fixing and aligning the oil pump to an engine frame, wherein a substantially flat bottom surface of the oil pump has face-engaging contact with a substantially flat top surface of the engine frame. The balancer shaft may receive rotational power from a crankshaft of the engine and is engaged with the drive end of the oil pump via meshing between male and female drives.

As seen in FIG. 4, each of the plurality of dowel bolts comprises an unthreaded shank, a dowel portion, and a threaded portion. The dowel portion is located in between the unthreaded shank and the threaded portion, wherein the unthreaded shank is located adjacent to a head of the dowel bolt. Furthermore, the dowel portion has a diameter that is greater than a diameter of the unthreaded shank and a diameter of the threaded portion. The dowel portion is machined to a tolerance to provide alignment between the oil pump, engine frame, and fully enclosed support structure. Lastly, when inserted into the oil pump and engine frame, the dowel portion of each of the dowel bolts has face-engaging contact with the oil pump on an upper half of the dowel portion and has face-engaging contact with the engine frame on a lower half of the dowel portion.

Figure 5:
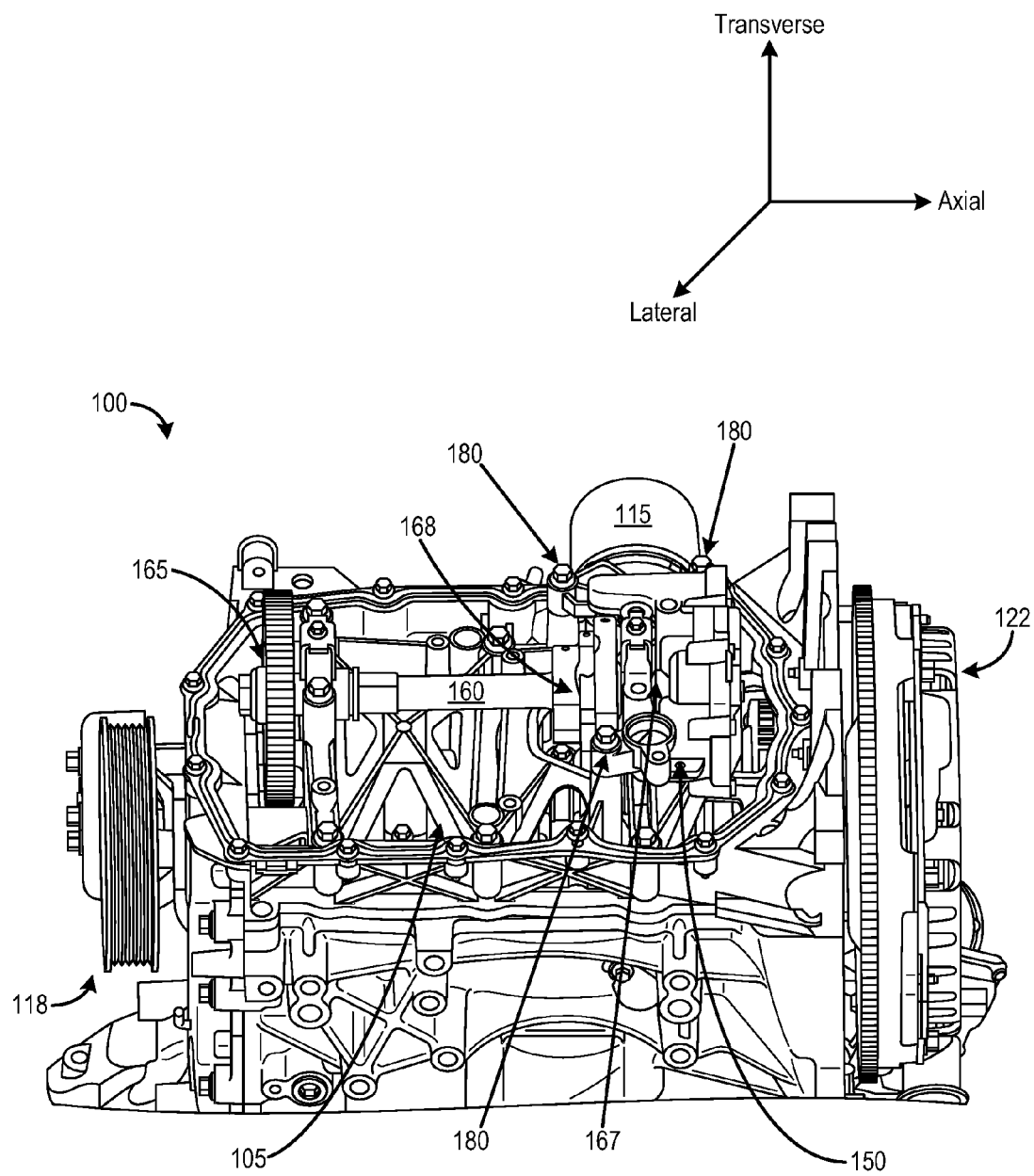
FIG. 5 shows a bottom perspective view of the engine assembly of FIG. 2 with the oil pump attached.

FIGS. 5-8 illustrate a method for removing the oil pump 150 from the engine assembly 100 while satisfying serviceability requirements for removal of the oil pump without affecting surrounding components. First, FIG. 5 shows a bottom perspective view of engine assembly 100 with oil pump 150 visible. FIG. 5 shows the engine assembly 100 of FIG. 1 from a slightly tilted angle from what is shown in FIG. 2. As such, a transverse direction is also visible which is perpendicular to both the previously-mentioned axial and lateral directions. The three dowel bolts 180 are shown inserted into oil pump 150 in FIG. 5 in a configuration such as when the engine assembly 100 is operational. The first step in removing oil pump 150 is unscrewing dowel bolts 180 to separate the oil pump from the frame 105.

Figure 6:
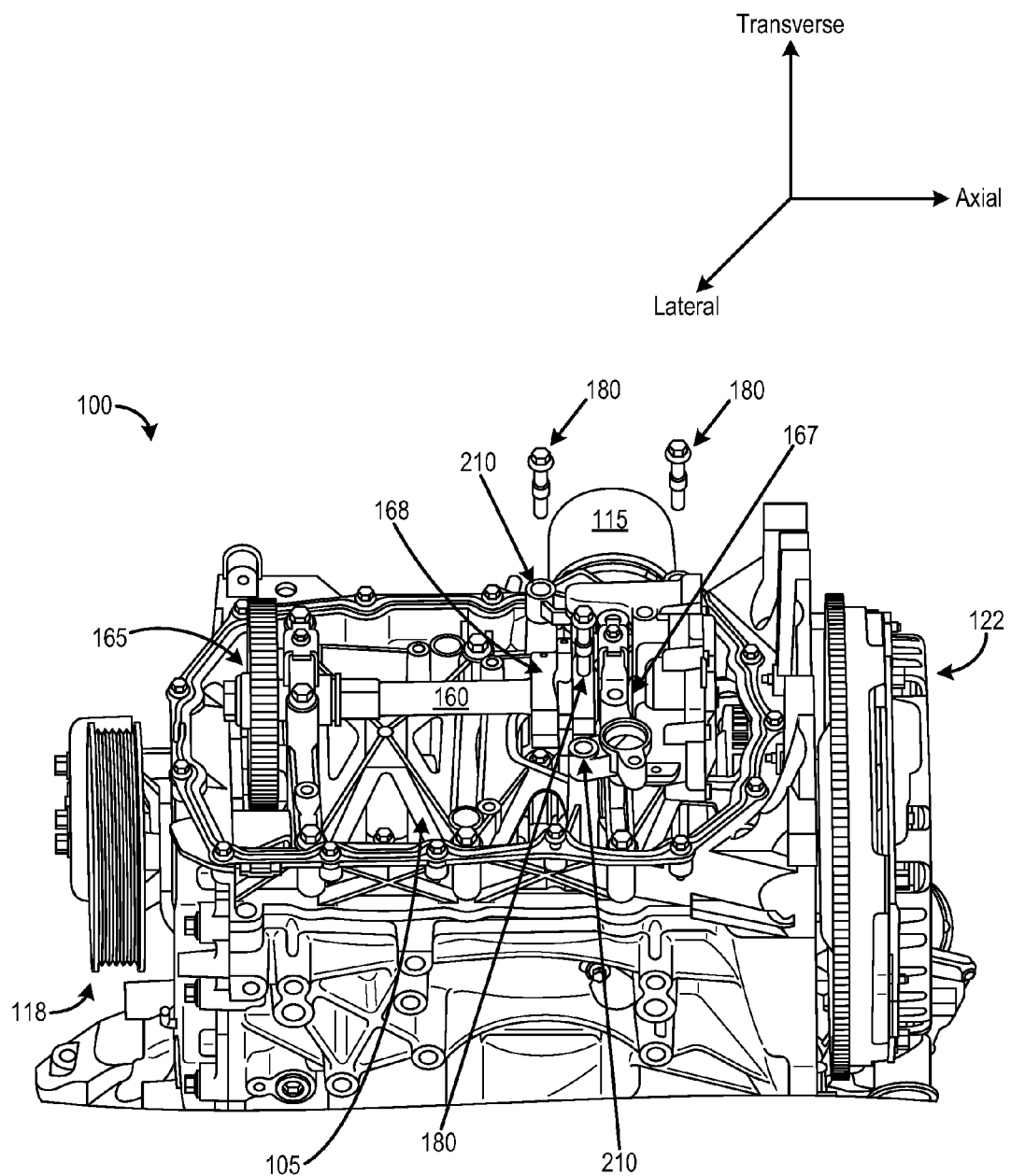
FIG. 6 shows the engine assembly of FIG. 5 with a plurality of dowel bolts removed.
Figure 7:
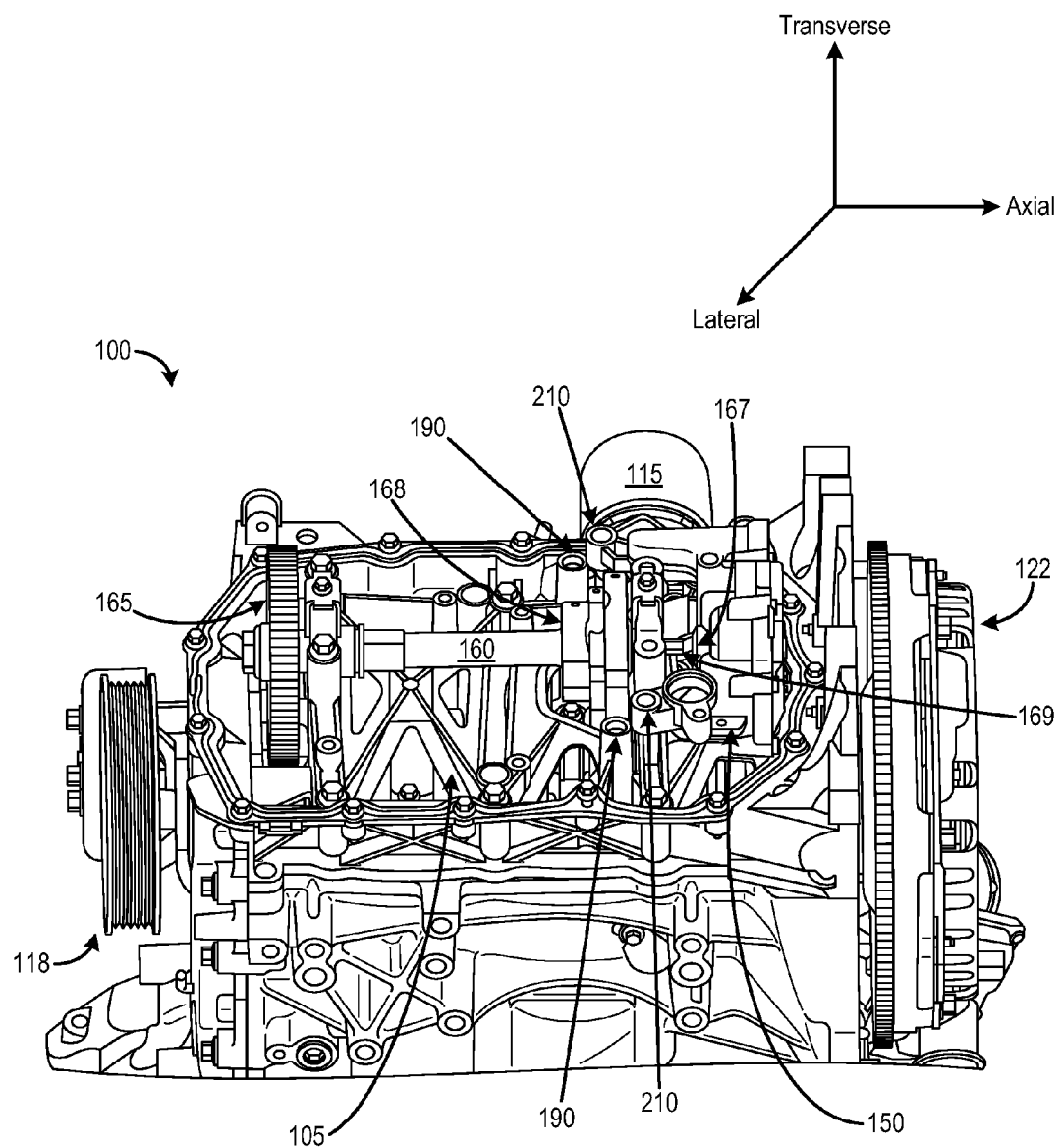
FIG. 7 shows the engine assembly of FIG. 6 with the oil pump moved in an axial direction.
Figure 8:
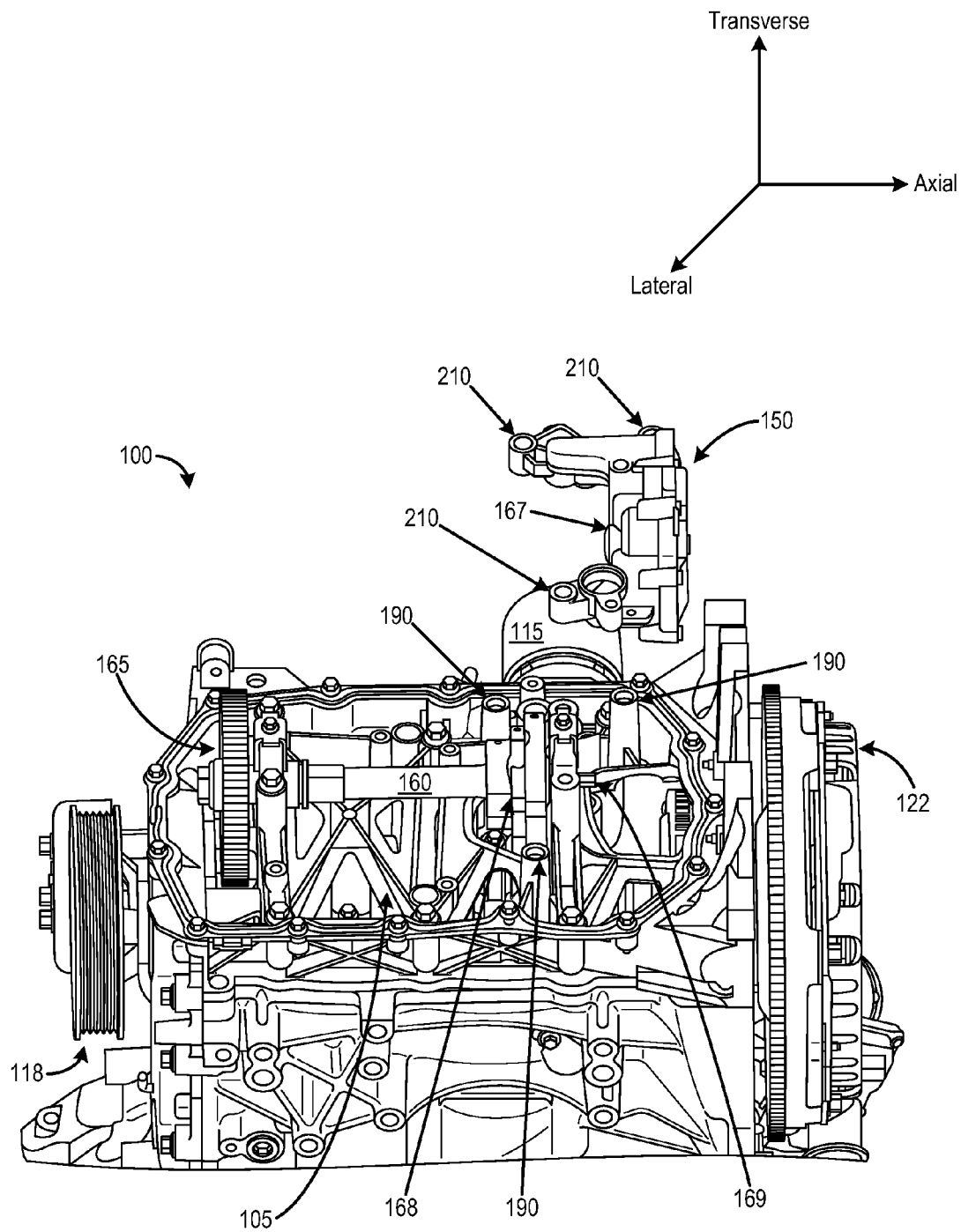
FIG. 8 shows the engine assembly of FIG. 7 with the oil pump removed.

Showing the same bottom perspective view as FIG. 5, FIG. 6 shows engine assembly 100 with the three dowel bolts 180 removed from the oil pump 150. With the dowel bolts 180 removed in FIG. 6, a number of holes 210 in the oil pump 150 can be seen, in which the dowel bolts are secured prior to removal. The visible holes may be substantially the same as second hole 210 of FIG. 4. Since dowel bolts 180 provide both alignment and fastening of oil pump 150, the oil pump is free to move axially upon removal of the bolts 180. Referring to FIG. 6, since the dowel bolts 180 have been removed, the oil pump 150 may slide towards the rear of the engine in the axial direction. As such, the fully enclosed support structure 168 may be disengaged from the oil pump 150 without disassembling the balancer shaft 160 and surrounding components. Thus, as seen in FIG. 7, the oil pump 150 is located in a more axial direction than what is shown in FIG. 5. A portion of a drive shaft 169 is visible in FIG. 7, which may extend from support structure 168 and removably insert into drive end 167 of the oil pump 150. Finally, as seen in FIG. 8, the oil pump 150 can be lifted from the engine assembly 100 in the transverse direction without needing to remove other components of the engine assembly. With oil pump 150 removed, the oil pump can be serviced to replace/repair parts of the oil pump or to replace the entire oil pump itself.

In another example, the previous description and figures provide an oil pump powered by a balancer shaft driven by a crankshaft of an engine, the balancer shaft partially inserted into a fully enclosed support structure from a first side, wherein the balancer shaft meshes with a drive end of the oil pump, the drive end partially inserted into the support structure from a second side opposite to the first side, the balancer shaft and drive end surrounded by the fully enclosed support structure; and a plurality of dowel bolts, each dowel bolt including a dowel portion for aligning the oil pump with an engine frame and a threaded portion for fixing the oil pump to the engine frame, and wherein a bottom surface of the oil pump engages with a top surface of the engine frame, thereby forming a contiguous, flat interface between the oil pump and engine frame. In this way, alignment between the oil pump and engine frame allows fluid ports of the oil pump to align with fluid ports of the engine frame to route oil through With this example, upon disengaging the oil pump from the balancer shaft, the oil pump is free to move in a transverse direction perpendicular to an axial direction and away from the engine frame. Additionally, the balancer shaft and oil pump are located underneath the engine at least partially inserted into an oil pan that covers a lower portion of the engine. The oil pump and engine frame further include holes for receiving the plurality of dowel bolts, and aligning the oil pump with the engine frame includes concentrically aligning the holes of the oil pump and engine frame. While inserted into the oil pump and engine frame, an upper section of the dowel portion is in face-engaging contact with the oil pump while a lower section of the dowel portion is in face-engaging contact with the engine frame.

Figure 9:
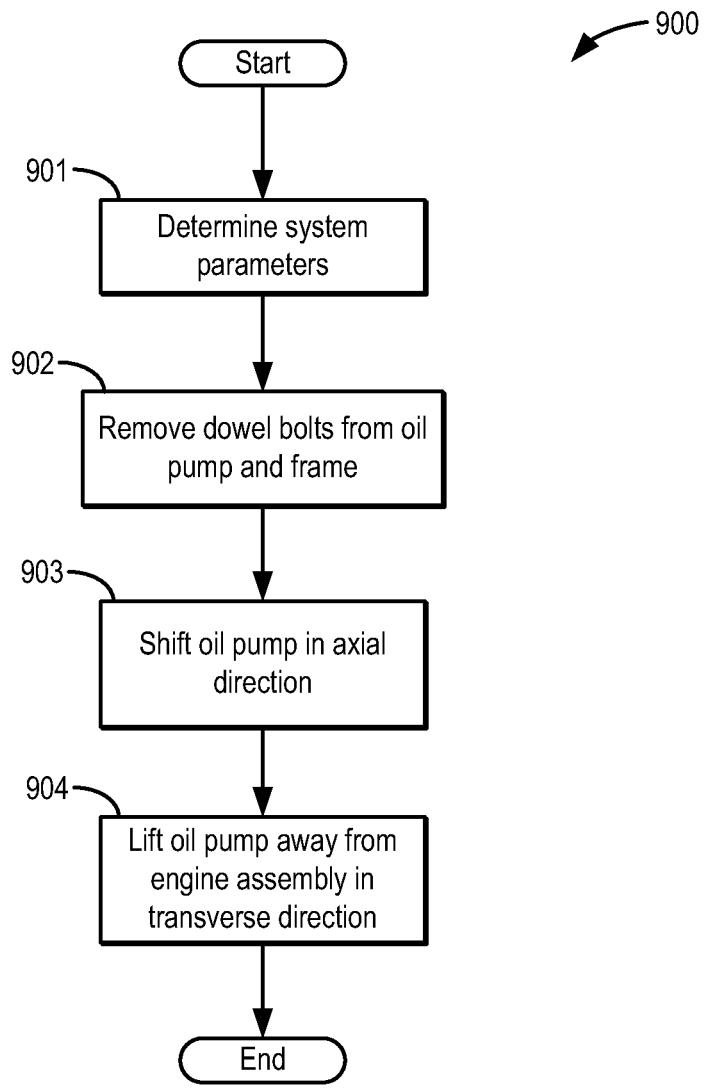
FIG. 9 shows a flow chart of a method for removing the oil pump from the engine assembly.

FIG. 9 shows a flow chart depicting a method 900 for removing oil pump 150 from engine assembly 100. Method 900 describes the process of removing the oil pump 150 as seen in FIGS. 5-8. First, at 901, a number of system parameters are determined. These parameters may include, but are not limited to, number and size of dowel bolts 180, torque requirements, and weight of the oil pump 150. These parameters may be determined by a service technician during maintenance of the engine and oil pump or another similar situation. Next, at 902, the method includes removing the dowel bolts 180 from the oil pump 150 and frame 105. A suitable tool may be used to apply a torque to loosen and remove the bolts 180 from holes 190 and 210. Upon removal of the dowel bolts 180, at 903 the method includes shifting the oil pump 150 in the axial direction towards the rear of engine assembly 100 along the bottom surface of the frame 105. By sliding the oil pump 150 in this direction, the fully enclosed support structure 168 and balancer shaft 160 may disengage from the oil pump, in particular from drive end 167. Finally, at 904, with the support structure 168 and oil pump 150 disengaged, the method includes lifting the oil pump away from the engine assembly 100 in the transverse direction. Again, the transverse direction may be perpendicular to the axial direction, as shown in previous figures.

FIGS. 5-8 provide a method, comprising: removing a plurality of dowel bolts from an oil pump and an engine frame the oil pump is adjacent to, the dowel bolts including a dowel portion for aligning the oil pump with the engine frame and a threaded portion for fixing the oil pump to the engine frame; sliding the oil pump in an axial direction along the engine frame to disengage the oil pump from a balancer shaft partially inserted into a fully enclosed support structure, the balancer shaft providing rotational power to the oil pump, wherein the axial direction is in-line with the balancer shaft; and lifting the oil pump from the engine frame in a transverse direction perpendicular to the axial direction, the oil pump unattached from the engine frame without removing the balancer shaft.

With this method, servicing of the oil pump can be accomplished by lifting it from the engine frame as described above. Furthermore, removing the plurality of dowel bolts includes unscrewing the dowel bolts with a suitable tool. The engine frame also includes tapped holes for receiving the plurality of dowel bolts and meshing with the threaded portion of each dowel bolt. Conversely, the oil pump includes untapped holes for receiving the plurality of dowel bolts prior to the dowel bolts entering the tapped holes of the engine frame.

In this way, serviceability issues associated with assembling and disassembling the balancer shaft and other components may be avoided. For example, when the balancer shaft is removed then put back into the engine assembly, the rotational timing of the balancer shaft may need to be checked with the rotational timing of the crankshaft to ensure proper performance. Alternatively, if the balancer shaft remains in place in the engine assembly with the proposed dowel bolts and oil pump removal method, then servicing or replacing the oil pump may require less time and money than other methods. In particular, warranty and servicing costs may be reduced. Furthermore, the risk of damage to the engine assembly and other engine components may be reduced by only removing the oil pump without disassembling the balancer shaft.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
an oil pump with a drive end that meshes with a balancer shaft inside a fully enclosed support structure, wherein the drive end fixedly rotates with the balancer shaft; and
a plurality of dowel bolts fixing and aligning the oil pump to an engine block frame, wherein a substantially flat surface of the oil pump has face-engaging contact with a substantially flat surface of the engine block frame, and wherein the plurality of dowel bolts is inserted through the oil pump and the engine block frame in a direction perpendicular to the balancer shaft.

2. The system of claim 1, wherein one end of the balancer shaft receives rotational power from a crankshaft of an engine via a gear drive and an opposite end of the balancer shaft is engaged with the drive end of the oil pump via meshing between male and female drives, and wherein the balancer shaft and oil pump are within a crankcase.

3. The system of claim 1, wherein the direction perpendicular to the balancer shaft is perpendicular to an axial direction and a lateral direction, the axial direction parallel to an axis of a crankshaft and the lateral direction perpendicular to and in a same plane as the axial direction.

4. The system of claim 1, wherein each of the plurality of dowel bolts comprises an unthreaded shank, a dowel portion, and a threaded portion, the dowel portion located between the unthreaded shank and the threaded portion, wherein the unthreaded shank is located adjacent to a head of the dowel bolt, and wherein the dowel portion has a diameter that is greater than a diameter of the unthreaded shank and a diameter of the threaded portion.

5. The system of claim 2, wherein the crankcase is integrated into a cylinder block as a single piece.

6. The system of claim 4, wherein when inserted into the oil pump and engine block frame, the dowel portion of each of the dowel bolts has face-engaging contact with the oil pump on an upper half of the dowel portion and has face-engaging contact with the engine block frame on a lower half of the dowel portion.

7. A system, comprising:
an oil pump powered by a balancer shaft driven by a crankshaft of an engine, the balancer shaft partially inserted into a fully enclosed support structure from a first side, wherein the balancer shaft meshes with a drive end of the oil pump, the drive end partially inserted into the support structure from a second side opposite to the first side, the balancer shaft and drive end surrounded by the fully enclosed support structure; and
a plurality of dowel bolts, each dowel bolt including a dowel portion for aligning the oil pump with an engine block frame and a threaded portion for fixing the oil pump to the engine block frame, wherein a surface of the oil pump engages with a surface of the engine block frame, thereby forming a contiguous, flat interface between the oil pump and engine block frame, and wherein the plurality of dowel bolts is inserted through the oil pump and the engine block frame in a direction perpendicular to the balancer shaft.

8. The system of claim 7, wherein each of the dowel bolts further includes an unthreaded shank such that the dowel portion is located in between the unthreaded shank and the threaded portion, and wherein the engine block frame is a ladder frame.

9. The system of claim 8, wherein a diameter of the dowel portion is larger than a diameter of the unthreaded shank and a diameter of the threaded portion, and wherein an upper section of the dowel portion is in face-engaging contact with the oil pump while a lower section of the dowel portion is in face-engaging contact with the engine block frame.

10. The system of claim 7, wherein upon disengaging the oil pump from the balancer shaft, the system is configured such that the oil pump is free to move in a transverse direction perpendicular to an axial direction and away from the engine block frame.

11. The system of claim 10, wherein the balancer shaft and oil pump are located underneath the engine, within a crankcase, and at least partially inserted into an oil pan that covers a lower portion of the engine.

12. The system of claim 7, wherein the oil pump and engine block frame include holes for receiving the plurality of dowel bolts in the direction perpendicular to the balancer shaft, and aligning the oil pump with the engine block frame includes concentrically aligning the holes of the oil pump and engine block frame.

13. The system of claim 7, wherein the direction perpendicular to the balancer shaft is perpendicular to an axial direction and a lateral direction, the axial direction parallel to an axis of the crankshaft and the lateral direction perpendicular to and in a same plane as the axial direction.

14. A method, comprising:
removing a plurality of dowel bolts from an oil pump and an engine block frame the oil pump is adjacent to, the dowel bolts including a dowel portion for aligning the oil pump with the engine block frame and a threaded portion for fixing the oil pump to the engine block frame;
sliding the oil pump in an axial direction along the engine block frame to disengage the oil pump from a balancer shaft partially inserted into a fully enclosed support structure, the balancer shaft providing rotational power to the oil pump, wherein the axial direction is in-line with the balancer shaft; and
lifting the oil pump from the engine block frame in a transverse direction perpendicular to the axial direction, the oil pump unattached from the engine block frame without removing the balancer shaft;
wherein the engine block frame has face-engaging contact with a substantially flat surface of the oil pump and wherein the plurality of dowel bolts is inserted through the oil pump and the engine block frame in a direction perpendicular to the balancer shaft.

15. The method of claim 14, wherein the direction perpendicular to the balancer shaft is perpendicular to the axial direction and a lateral direction, the axial direction parallel to an axis of a crankshaft and the lateral direction perpendicular to and in a same plane as the axial direction.

16. The method of claim 15, wherein the oil pump includes tapped holes for receiving the plurality of dowel bolts and meshing with the threaded portion of each dowel bolt and untapped holes for receiving the plurality of dowel bolts prior to the dowel bolts entering tapped holes of the engine block frame.

* * * * *